US00RE35835E

United States Patent [19]

Eidam et al.

[11] E Patent Number: Re. 35,835

[45] Reissued Date of Patent: Jul. 7, 1998

[54] DEVICE FOR ATTACHING AN AGRICULTURAL IMPLEMENT TO A TRACTOR

[75] Inventors: Manfred Eidam, Wilthen; Michael Flanhardt, Köln; Stefan Rauschenbach, Grosspostwitz; Andreas Roth, Neunkirchen-Seelscheid, all of Germany

[73] Assignee: GKN Walterscheid GmbH, Lohmar, Germany

[21] Appl. No.: 661,954

[22] Filed: Jun. 12, 1996

Related U.S. Patent Documents

Reissue of:

[64] Patent No.: 5,462,131
Issued: Oct. 31, 1995
Appl. No.: 313,720
Filed: Sep. 27, 1994

[30] Foreign Application Priority Data

Sep. 29, 1993 [DE] Germany ..... 43 33 035.5

[51] Int. Cl.[6] ..... B60K 25/06

[52] U.S. Cl. ..... 180/14.4; 180/53.3; 172/47

[58] Field of Search ..... 180/53.1, 53.3, 180/53.6, 14.4; 280/415.1; 74/15.2; 172/107, 125, 47, 74

[56] References Cited

U.S. PATENT DOCUMENTS 4,366,877 1/1983 Vissers et al. ..... 180/53.1
4,714,123 12/1987 Ermacora et al. ..... 180/14.4
4,793,430 12/1988 Stephenson et al. ..... 180/14.4
4,838,015 6/1989 Mouret et al. ..... 180/53.3
5,339,907 8/1994 Roth ..... 172/678

FOREIGN PATENT DOCUMENTS 41 36 492 5/1993 Germany .

*Primary Examiner*—Paul N. Dickson
*Attorney, Agent, or Firm*—Harness, Dickey & Pierce, P.L.C.

[57] ABSTRACT

A device which attaches an agricultural implement (2) to a tractor (1), and in addition, establishes a driving connection between the power take-off shaft of the tractor and the drive of the implement has, for this purpose, a drive unit (8) which includes two bevel gear angle drives (9, 10) arranged one above the other. One of the drives (9, 10) is firmly connected to the drawbar of the implement with the other one connectable to the lower steering arm of the tractor by an attaching stirrup (12). The attaching system allows the tractor and implement to pivot relative to one another around a vertical axis (25), a transverse axis (26) and a longitudinal axis (27). To achieve pivotability relative to the drive unit (8) around the longitudinal axis (27), the attaching stirrup (12) is supported by a sleeve (47) on a flange housing (39) which is arranged coaxially relative to the first connecting journal (20) of the drive unit (39) thereby achieving an improvement in the transmission of towing forces.

5 Claims, 4 Drawing Sheets

DEVICE FOR ATTACHING AN AGRICULTURAL IMPLEMENT TO A TRACTOR

Matter enclosed in heavy brackets [ ] appears in the original patent but forms no part of this reissue specification; matter printed in italics indicates the additions made by reissue.

BACKGROUND OF THE INVENTION

The invention relates to a device for attaching an agricultural implement to a tractor and for establishing a driving connection between the tractor power take-off shaft and the drive or driveline driving the implement. A drive unit is provided with a first and second drive arranged one above the other. The first lower drive includes a first connecting journal which, via a driveshaft, is, for drive purposes, connectable to the tractor power take-off shaft. The second drive arranged above the first drive includes a second connecting journal connected to the drive or driveline of the implement The two connecting journals are arranged in planes extending parallel relative to one another. The first and second drives, via a pivot bearing, are pivotable around a pivot axis which is arranged at a right angle relative to the two connecting journals. The pivot bearing enables the tractor and implement to pivot relative to one another around a vertical axis. A drawing mechanism is arranged between the second drive and the implement. An attaching stirrup, including two arms adapted for connection with one of the two lower steering arms of the tractor, enables the implement, when connected, to be inclined relative to the tractor around a transverse axis. A tilting bearing enables the implement to be inclined sideways around a longitudinal axis relative to the tractor. The longitudinal axis intersects the transverse axis at a right angle at a distance. The longitudinal axis is formed by the rotational axis of the first connecting journal of the first drive.

Such a device is described in EP 0 027 295 A1, with the bearing sleeve of the attaching stirrup directly supported on the connecting journals of a drive. The transverse axis, around which the implement may be inclined relative to the tractor, extends through the rotational axis of the connecting journal.

In the case of such an assembly, the drawing forces, applied by the tractor to the implement act as bending forces on the pivot bearing to a considerable extent because a long distance exists between the pivot bearing and the transverse axis. Since the connecting journal acts as a direct bearing element, any loads applied to the connecting journal also affect the functioning of the drive.

SUMMARY OF THE INVENTION

It is the object of the invention to provide an attaching device where the force introduction conditions are improved while production and material costs are reduced.

In accordance with the invention, the transverse axis is offset upwardly from the longitudinal axis towards the second drive. Also, the tilting bearing is formed by a bearing housing which supports the connecting journal. Further, a sleeve, which is positioned on the bearing housing, forms part of the attaching stirrup.

An advantage of this embodiment is that the load is reduced on the pivot bearing. Reduction occurs due to the articulation point of the lower steering arm being displaced in the vertical height of the endangered cross-section of the pivot bearing.

Furthermore, it is possible to reduce production and material costs because there is no assembly interface between the drive and the attaching stirrup. The pivot bearing is capable of achieving a pivot angle of 360° to enable the implement to rotate in a collision-free way when overturning. The first connecting journal is not subject to any direct forces, so that drive functioning also remains unaffected.

As far as the force conditions are concerned, a particularly advantageous embodiment is obtained if the pivot bearing includes two rolling contact bearings. The bearings are centered on the pivot axis and are arranged at a distance from one another, with the transverse axis, with respect of height, arranged in a plane which extends centrally between the two rolling contact bearings.

The bearing conditions of the attaching stirrup may be improved by supporting the sleeve on the outer face of the bearing housing, with bearing bushes arranged therebetween. To provide axial support, stop discs are provided which rest against the ends of the sleeve and/or of the bearing bushes. The discs serve to provide axial support against stops of the bearing housing. The attaching stirrup and the bearing housing can easily be replaced because the bearing housing is flanged to the housing of the first drive.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE PREFERRED EMBODIMENTS

Figure 1:
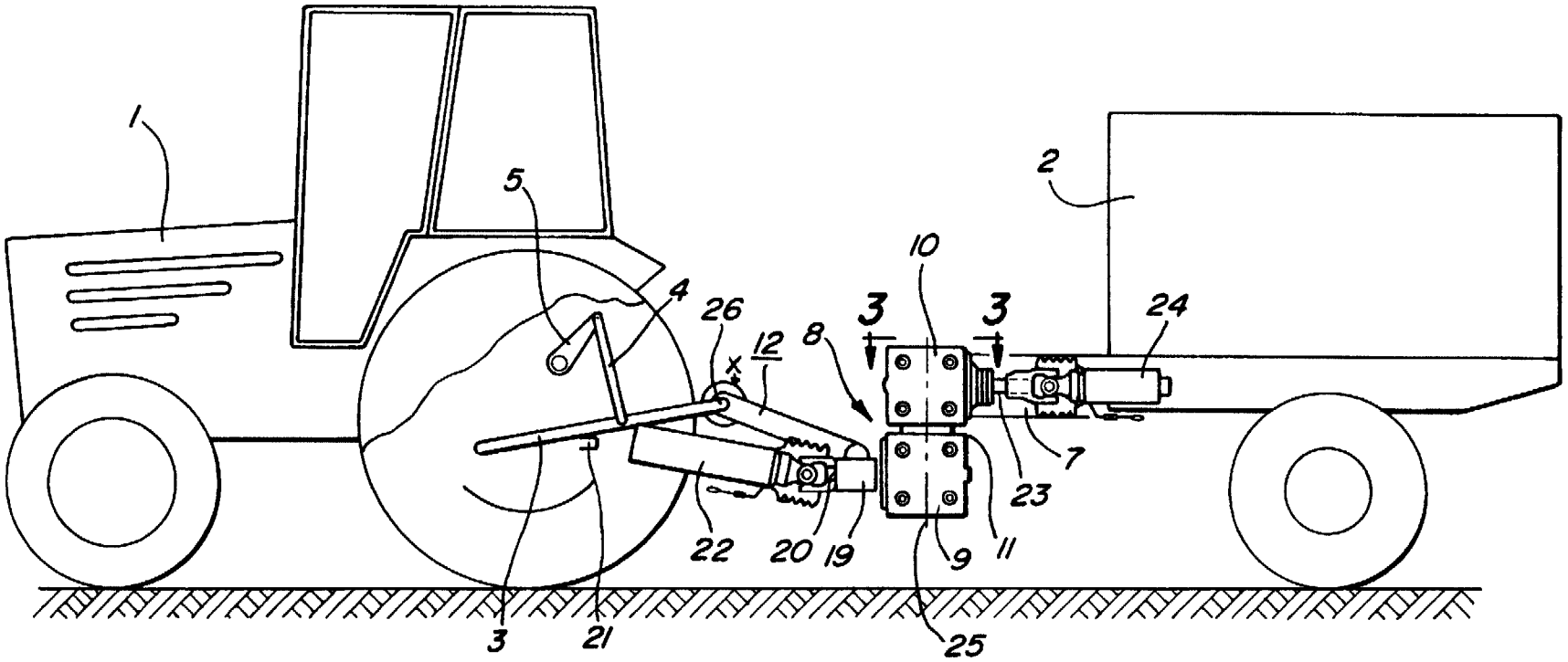
FIG. 1 is a schematic side view of the attaching device in accordance with the invention connecting a tractor to an implement.
Figure 2:
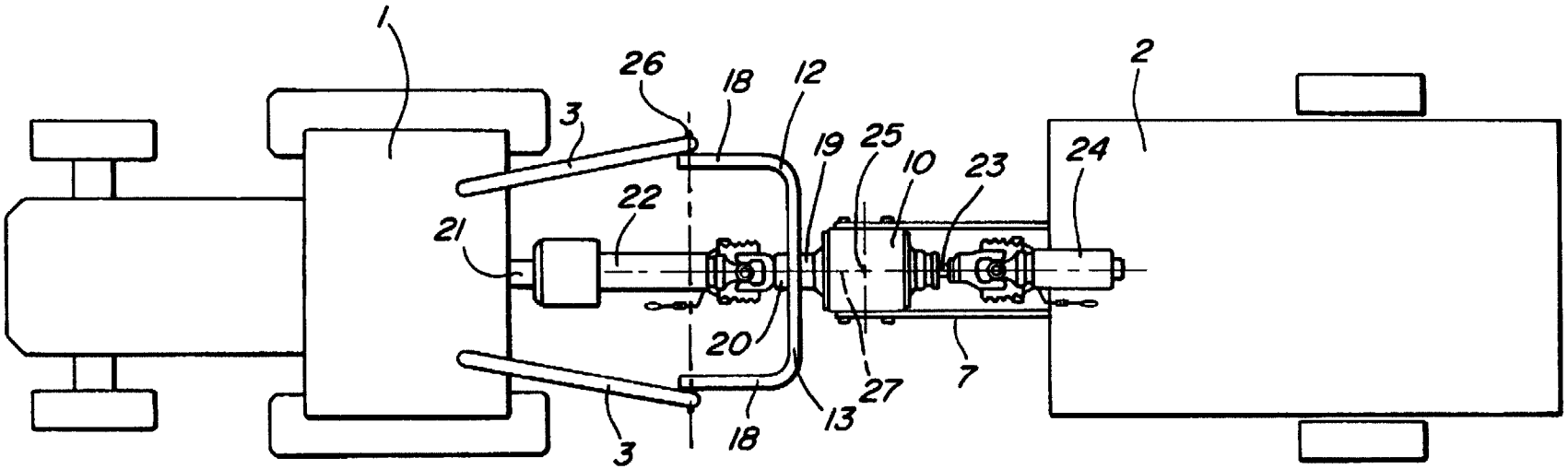
FIG. 2 is a plan view according to FIG. 1.

FIGS. 1 and 2 show a tractor 1 with an implement 2 attached to the tractor and towed as well as driven by the tractor. The tractor 1 is provided with lower steering arms 3 arranged at the tractor rear so as to be offset in parallel relative to the longitudinal axis. The lower steering arm 3 is connected to the power lift device 5 by a lifting strut 4. The free end of the lower steering arm 3 is provided with a coupling hook 6. The implement 2 is provided with two towing arms 7 arranged in parallel relative to one another.

To connect the implement 2 to the tractor 1 a device is provided which includes a drive unit 8 having a first lower drive 9 and a second drive 10 arranged thereabove. Both drives 9, 10 are pivotably connected to one another by a pivot bearing 11 around a pivot axis 25, constituting a vertical axis. Furthermore, the drive unit 8 is connected to an attaching stirrup 12. The stirrup includes a transverse bar 13 which cooperates with a tilting bearing 19 associated with the first connecting journal 20. The connecting journal 20 defines a rotational axis 27 which at the same time forms the longitudinal axis for lateral inclinations of the implement 2 relative to the tractor 1.

Figure 1A:
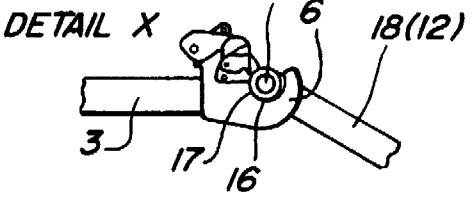
FIG. 1a is an enlarged detail view within circle X of FIG. 1.

The attaching stirrup 12 includes two parallel arms 14 which extend at an angle upwardly from the tilting bearing 19. The arms 14, with reference to the longitudinal axis 27, include outwardly directed bearing pins 15 at their free ends. The bearing pins 15 serve to provide a connection with the coupling hooks 6 of the two lower steering arms 3. Each bearing pin 15 carries a bearing ball 16 and, optionally, a catching plate (not illustrated) to center the coupling hook 6 relative to the bearing balls 16. As can be seen in FIG. 1a, the bearing ball 16 is received in a bearing recess 17 of the coupling hook and securely connected thereto by a bolt (not described in greater detail).

The connecting journal 20 of the first drive 9 is rotationally connected to the power take-off shaft 21 of the tractor 1 by a driveshaft 22. The second drive 10 is provided with a second connecting journal 23 which is connected to a further driveshaft 24, which, in turn, is connected to the drive of the implement 2. The drive unit 8 thus also effects a driving connection between the power take-off shaft 21 and the implement 2. The power take-off shaft 21, via the driveshaft 22 and the connecting journal 20, passes its rotational movement to the first drive 9, which is rotationally connected to the second drive 10, which drives the driveshaft 24 through its connecting journal 23.

Figure 3:
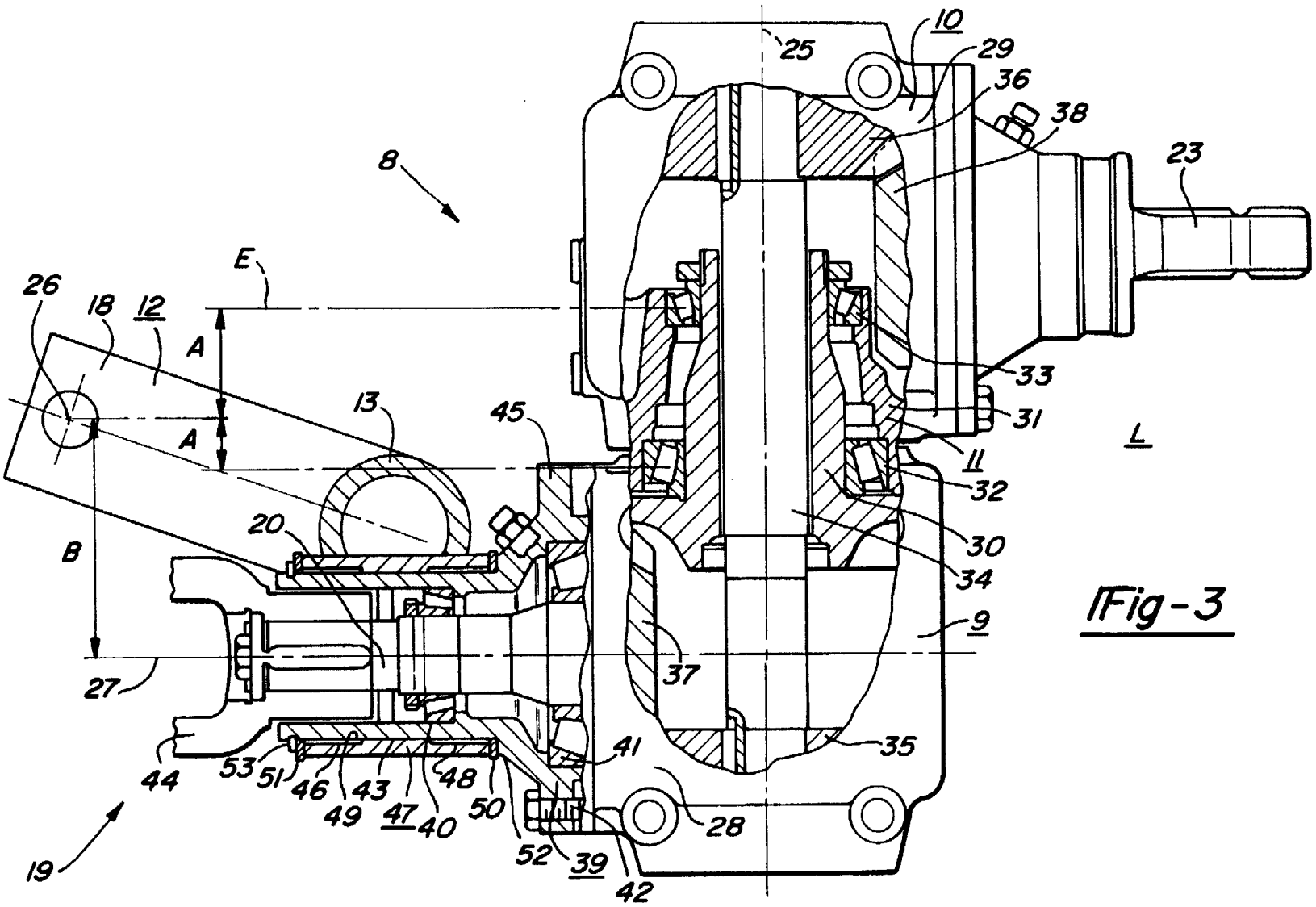
FIG. 3 is a partial cross sectional side view of a drive unit of FIG. 1 along line 3—3 thereof.
Figure 4:
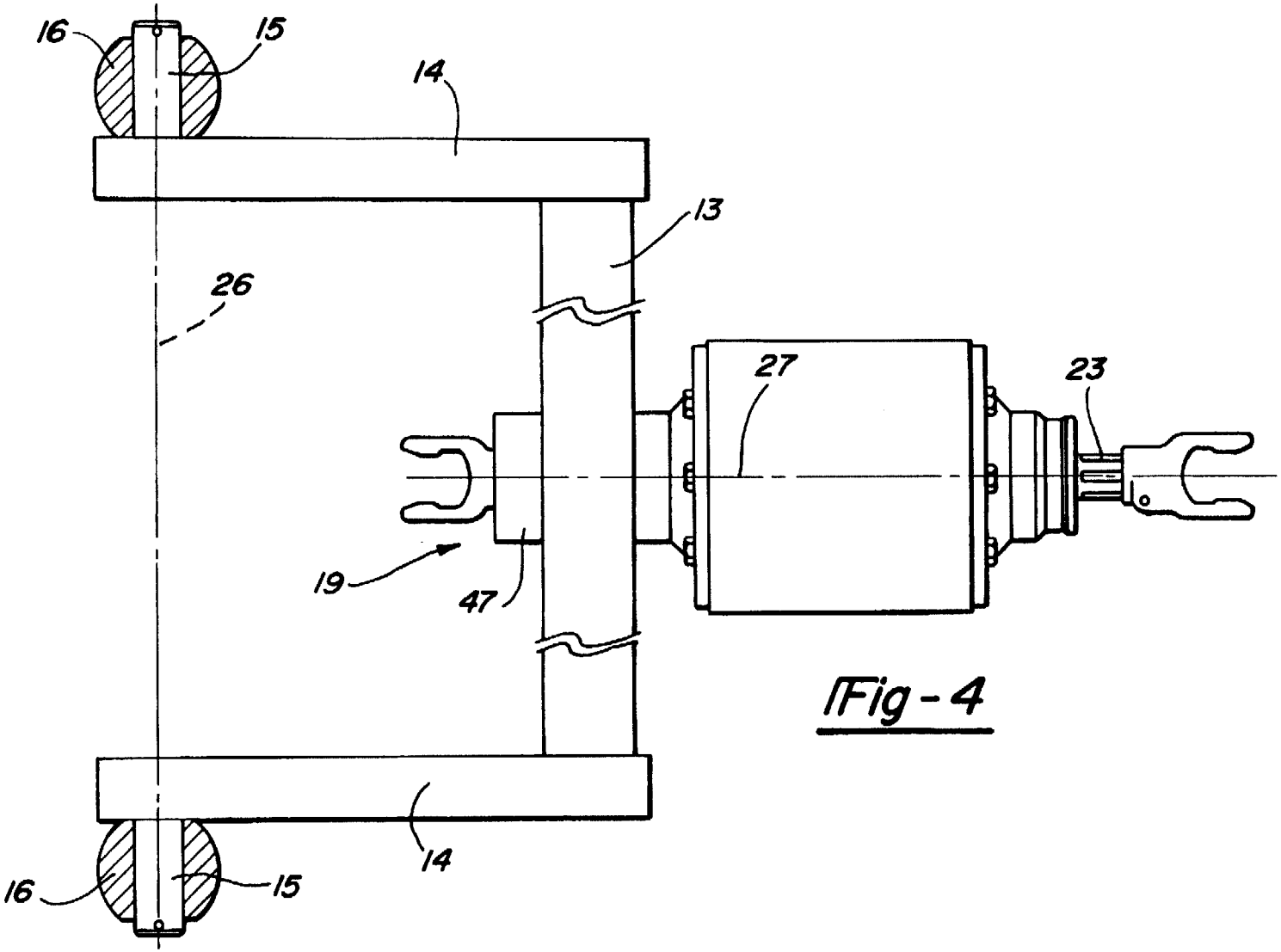
FIG. 4 is a plan view according to FIG. 3.

FIGS. 2 and 3, in detail, show the drive unit 8 and its connection with the attaching stirrup 12.

The first, lower drive 9 includes a drive housing 28. An inner bearing sleeve 30 upwardly projects from the housing 28 toward the second drive housing 29 of the second drive 10. The bearing sleeve 30 extends into an outer bearing sleeve 31 of the housing 29 of the second drive 10. The two bearing sleeves 30, 31 form part of the respective drive housings 28, 29. Rolling contact bearings 32, 33 are arranged between the two bearing sleeves 30, 31 at a distance 2×A from one another. The two rolling contact bearings 32, 33 are rotationally centered on the pivot axis 25. A connecting shaft 34, which may be supported in the inner bearing sleeve 30 for example, is also centered and arranged on the pivot axis 25. The ends of the connecting shaft 24 extend inside the two drive housings 28, 29 and carry bevel gears 35, 36.

The bevel gear 35 of the first drive 9 engages a further bevel gear 37 which forms part of the first connecting journal 20. The connecting journal 20 is rotatably supported in the bearing housing 39 by spaced rolling contact bearings 40, 41. The bearing housing 39 is designed as a flange housing. The flange 45 of housing 39 is positioned adjacent the drive housing 28 of the first drive 9 and securely connected thereto by bolts 42. The connecting journal 20 serves to be connected to the joint yoke 44 of the driveshaft 22 (shown in FIG. 1) which, in turn, is connected to the power take-off shaft 21. The bearing housing 39 includes a sleeve portion 46 whose outer face is provided with a bearing face 43.

A second bevel gear 36 engages bevel gear 38 which forms part of the second connecting journal 23 of the second drive 10. Journal 23 is connected to the driveshaft for driving the implement A sleeve 47 which forms part of the attaching stirrup 12 is supported on the bearing face 43 of the bearing housing 39. Bearing bushes 48, 49 are arranged between the sleeve 47 and bearing face 43. The bearing bushes 48, 49 are inserted into bores at the ends of the sleeve 47. The bushes either include collars or stop discs 50, 51 provided between the ends of the bearing bushes 48, 49 and the sleeve 47 and between a shoulder 52 and a securing ring 53 which is inserted into a groove of the bearing housing 39. The sleeve 47, via the stop discs 50, 51, is axially supported on the shoulder 52 and the securing ring 53 to be able to transmit the axial forces from the attaching stirrup 12 to the drive unit 8 and from the implement 2 to the attaching stirrup 12. The bearing bushes 48, 49 and stop discs 50, 51 may be produced from a material with advantageous friction properties.

It can also be seen that the sleeve 47 is securely connected to the transverse bar 13 of the attaching stirrup 12. The ends of the transverse bar 12 are provided with arms 18 extending upwardly at an angle. The free ends of the arms 18 are secured to bearing pins 15 which extend away from the longitudinal axis 27 and transversely thereto and which form the transverse axis 26. The bearing pins 15 receive the bearing balls 16 to be connected to the coupling hooks of the lower steering arms of the tractor 1. The transverse axis 26 of the bearing pins 15 intersects the longitudinal axis 27 at a right angle at a distance B. With respect to height, the rotational axis 26 is arranged in such a way that, in the aligned condition, it is positioned in a plane E which extends centrally between the two bearing planes of the rolling contact bearings 32, 33 of the pivot bearing. The distance B of the axis 26 is thus equal to the distance between the longitudinal axis and the plane E.

While the above detailed description describes the preferred embodiment of the present invention, the invention is susceptible to modification, variation, and alteration without deviating from the scope and fair meaning of the subjoined claims.

We claim:

1. A device for attaching an agricultural implement to a tractor and for establishing a driving connection between a power take-off shaft of the tractor and a drive or a driveline for driving the implement comprising;

a drive unit having first and second drives arranged one above the other, said first drive includes a first connecting journal which, by a driveshaft, is connectable to the power take-off shaft of the tractor;

said second drive arranged above said first drive, said second drive includes a second connecting journal connected to the drive or driveline of the implement, said two connecting journals arranged in planes extending parallel relative to one another, said first and second drives, via a pivot bearing, being pivotable around a pivot axis which is arranged at a right angle relative to the two connecting journals, said pivot enables the tractor and implement to pivot relative to one another around a vertical axis;

drawing means arranged between the second drive and the implement;

an attaching stirrup having two arms adapted for connection with one of two lower steering arms of the tractor and adapted for enabling the implement to be inclined relative to the tractor around a transverse axis;

a tilting bearing enabling the implement to be inclined sideways around a longitudinal axis relative to the tractor, with the longitudinal axis intersecting the transverse axis at a right angle and with the longitudinal axis being formed by the rotational axis of the first connecting journal of the first drive, the transverse axis is offset upwardly from the longitudinal axis towards the second drive and the tilting bearing is formed by a bearing housing supporting the first connecting journal and by a sleeve which is positioned on the bearing housing and forms part of the attaching stirrup.

2. A device according to claim 1, wherein the pivot bearing includes two rolling contact bearings which are centered on the pivot axis and which are arranged at a distance from one another, and the transverse axis is arranged in a plane which extends centrally between the two rolling contact bearings.

3. A device according to claim 1, wherein the sleeve is supported on an outer face of the bearing housing, with bearing bushes arranged therebetween.

4. A device according to claim 3, wherein stop discs are provided which rest against the ends of the sleeve and of the bearing bushes and which serve to provide axial support against stops of the bearing housing.

5. A device according to claim 1, wherein the bearing housing is connected to a housing of the first drive by a flange.

* * * * *